United States Patent [19]

Nakamura et al.

[11] Patent Number: 4,524,191
[45] Date of Patent: Jun. 18, 1985

[54] POLYESTER COMPOSITION AND PRODUCTION THEREOF

[75] Inventors: Katuyuki Nakamura, Miyazaki; Kazuya Neki, Shizuoka, both of Japan

[73] Assignee: Asahi Kasei Kogyo Kabushiki Kaisha, Japan

[21] Appl. No.: 462,636

[22] Filed: Jan. 31, 1983

Related U.S. Application Data

[63] Continuation of Ser. No. 252,501, Apr. 8, 1981, abandoned.

[30] Foreign Application Priority Data

Sep. 30, 1980 [JP] Japan ................................ 55-136048
Nov. 22, 1980 [JP] Japan ................................ 55-164775

[51] Int. Cl.$^3$ ...................... C08L 67/02; C08L 77/06; C08K 7/14
[52] U.S. Cl. .................................. 525/425; 524/438; 524/605; 524/606
[58] Field of Search ................ 525/425; 524/605, 606, 524/438

[56] References Cited

U.S. PATENT DOCUMENTS 3,522,328  7/1970  Caldwell et al. .................... 525/425
3,591,673  7/1971  Pollack ................................ 264/166
3,884,989  5/1975  Blomberg ........................... 525/109

FOREIGN PATENT DOCUMENTS 123645  9/1980  Japan .

Primary Examiner—John C. Bleutge
Assistant Examiner—Robert E. L. Sellers, II
Attorney, Agent, or Firm—Sughrue, Mion, Zinn, Macpeak, and Seas

[57] ABSTRACT

A polyester composition for molding having improved molding properties is disclosed, comprising 100 parts by weight of a polyester comprising mainly polyethylene terephthalate and 0.05 to 10 parts by weight of an aromatic polyamide as a nucleating agent which is uniformly dispersed in the polyester in a substantial size of 50 μm or less. A process for producing the polyester composition is also disclosed.

24 Claims, 1 Drawing Figure

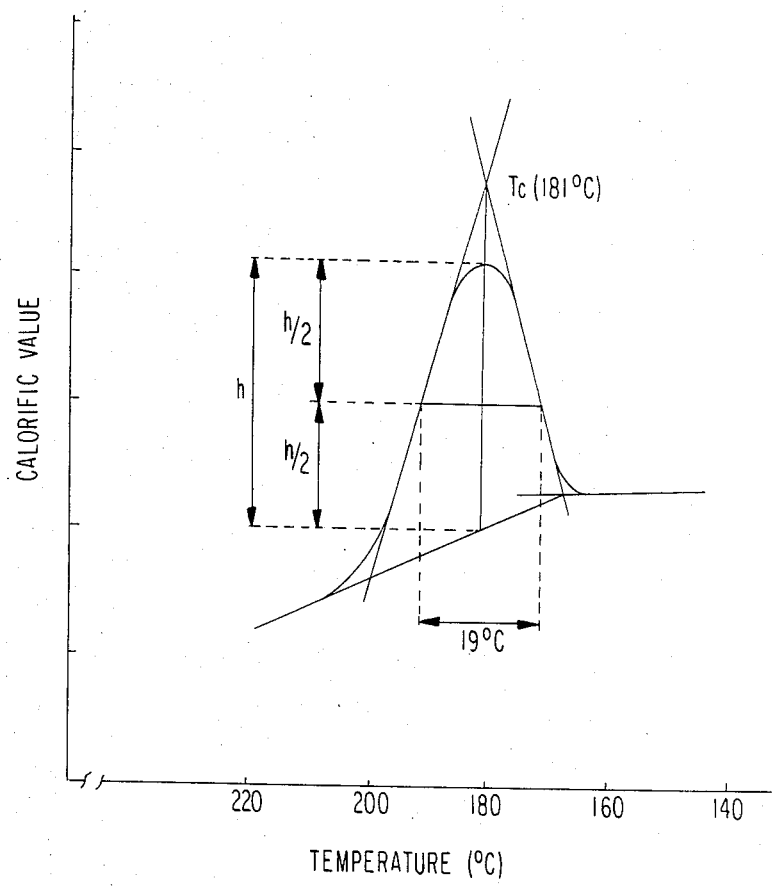

POLYESTER COMPOSITION AND PRODUCTION THEREOF

This is a continuation of application Ser. No. 252,501, filed Apr. 8, 1981, now abandoned.

FIELD OF THE INVENTION

This invention relates to a polyester composition for molding having improved molding properties, and, more particularly, to a polyester composition having an improved polyethylene terephthalate-crystallizing rate and which is capable of providing moldings having an excellent surface and excellent physical properties even at a low mold temperature.

BACKGROUND OF THE INVENTION

Polyethylene terephthalate has been used for various products such as fibers and films, due to its excellent heat resistance, chemical resistance, electric characteristics, etc. However, in the case of using it for injection-molded plastic products, the molding work involves many limitations due to its peculiar crystallization behavior. Thus, it has been found to be seriously restricted in molding applications in spite of its excellent characteristics, because polyethylene terephthalate is an essentially crystalline polymer with a slow crystallizing rate.

SUMMARY OF THE INVENTION

As a result of intensive investigations to find a nucleating agent which functions to cause a rapid crystallization of polyethylene terephthalate (shown by the appearance of a sharp crystallization exothermic peak measurable by means of a differential scanning calorimeter (DSC) under cooling conditions) when the temperature reaches a certain level in the course of cooling polyethylene terephthalate starting from a molten state, it has now been found that crystallization of polyethylene terephthalate can be accelerated by combining polyethylene terephthalate with a specific type of aromatic polyamide. Further study has lead to the discovery that the thus-obtained composition can be molded even at a low mold temperature. Thus, the present invention has been achieved.

The present invention provides a moldable polyester composition comprising:

(A) 100 parts by weight of polyester comprising mainly polyethylene terephthalate and having a reduced specific viscosity ($\eta sp/c$) of at least 0.3; and (B) from 0.05 to 10 parts by weight of at least one aromatic polyamide containing at least one of (1) a diamine group represented by the formula (I)

$$-NH-Ar_1-NH-  \quad (I)$$

wherein $Ar_1$ represents a divalent aromatic group; (2) a dicarboxylic acid group represented by the formula (II)

$$-CO-Ar_2-CO-  \quad (II)$$

wherein $Ar_2$ represents a divalent aromatic group; and (3) an aminocarboxylic acid group represented by the formula (III)

$$-NH-Ar_3-CO-  \quad (III)$$

wherein $Ar_3$ represents a divalent aromatic group, linked to each other through amido bonds, wherein said component (B) is uniformly dispersed in said component (A) in a substantial size of 50 μm or less, and a half width of an exothermic peak of the polyester composition measured in a crystallization temperature range by a differential scanning calorimeter at a cooling rate of 10° C./min is 15° C. or less per 8 mg of said component (A).

BRIEF DESCRIPTION OF THE DRAWING

FIGURE shows an exothermic peak temperature (Tc) and a half width (ΔT) of the exothermic peak based on crystallization of polyethylene terephthalate measured by a differential scanning calorimeter (DSC).

DETAILED DESCRIPTION OF THE INVENTION

As the polyester of component (A) comprising mainly polyethylene terephthalate, conventionally known polyesters comprising mainly polyethylene terephthalate, e.g., polyethylene terephthalate homopolymer, copolymers containing at least 70 mol% ethylene terephthalate repeating units, and polyester mixtures containing at least 70 mol% of polyethylene terephthalate can be selected. It is usually preferable to select the polyester from those having a reduced specific viscosity ($\eta sp/c$) of at least 0.3, depending on the intended end-use.

Component (B) of the present invention functions as a nucleating agent for component (A). Component (B) is an aromatic polyamide having a melting (or decomposition) point of, preferably, not lower than 270° C., and particularly preferably, not lower than 300° C.

The aromatic polyamide can be exemplified by those which are formed by at least one of the amido unit represented by the formula (IV)

$$-NH-Ar_4-NH-CO-Ar_5-CO-  \quad (IV)$$

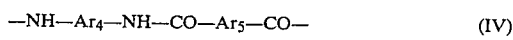

wherein $Ar_4$ and $Ar_5$ each represents a divalent aromatic group, and the amido unit represented by the formula (V)

$$-NH-Ar_6-CO-  \quad (V)$$

wherein $Ar_6$ represents a divalent aromatic group.

Examples of said divalent aromatic groups $Ar_4$, $Ar_5$, and $Ar_6$ in the above formulae (IV) and (V) include, for example, p-phenylene, m-phenylene, 4,4'-biphenylene, 3,4'-biphenylene, 1,3-naphthylene, 1,4-naphthylene, 1,5-naphthylene, 1,6-naphthylene, 1,7-naphthylene, 2,6-naphthylene, 2,5-pyridylene, 2,4-pyridylene,

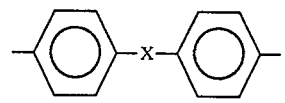

(wherein X represents $-CH_2-$, $-O-$, $-NH-$, $-CO-$, $-SO_2-$ or the like),

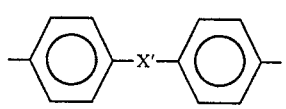

(wherein X' represents

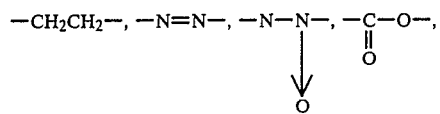

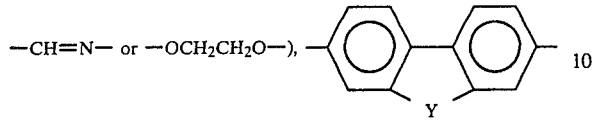

(wherein Y represents —SO$_2$—, —CO— or —CH$_2$—), and the like. One, two or more of these are selected for use. The aromatic moiety thereof may have one or more non-rective substituents such as a halogen atom, an alkyl group, an alkoxy group, a nitro group, a cyano group, etc.

Examples of the amido unit represented by the formula (IV) include:

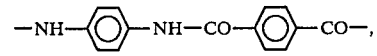

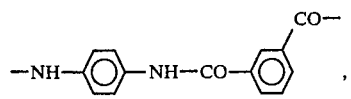

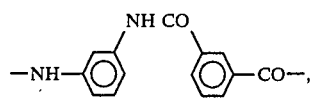

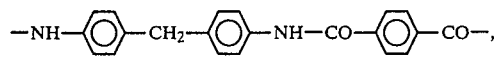

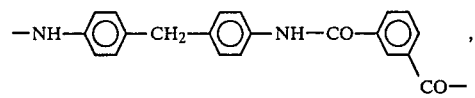

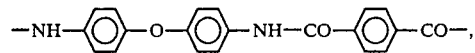

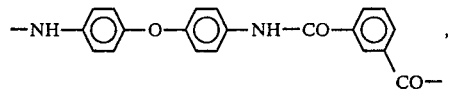

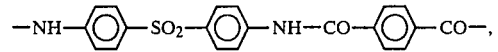

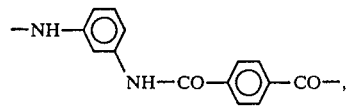

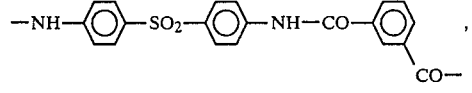

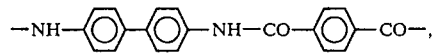

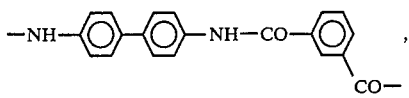

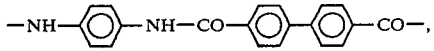

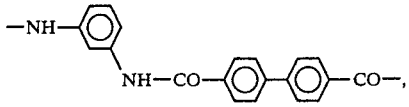

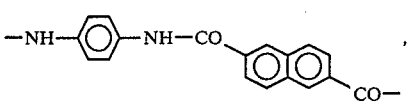

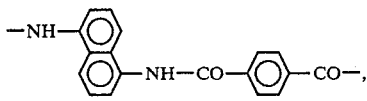

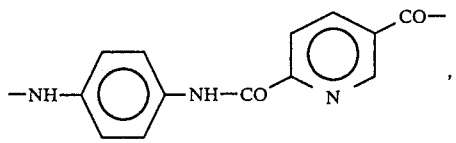

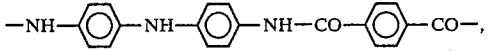

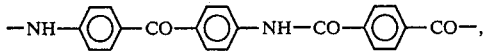

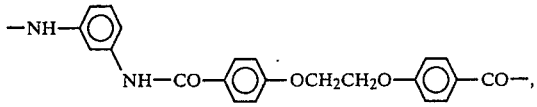

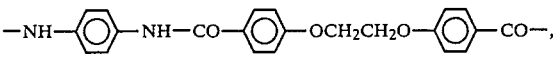

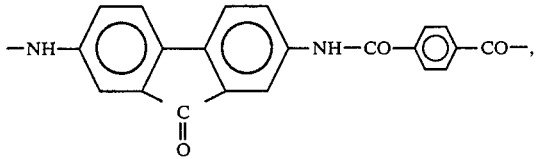

and

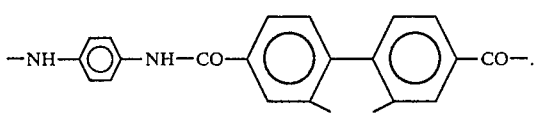

Examples of the amido group represented by the formula (V) include

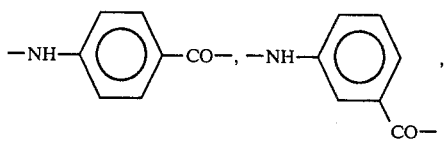

etc.

One, two, or more different kinds of these amido units can be selected. In addition, other amido units or hydrazido units may also be used provided that they do not interfere with the nucleating function of component (B).

These aromatic polyamides permit reduction in the degree of polymerization thereof while not decreasing the melting point below 270° C., and particularly preferably not below 300° C. The number of the amido units are at least two, preferably five or more, in terms of the sum of the number of amido bonds contained therein.

The aromatic polyamides may be blocked at their terminal ends with a monofunctional compound. As such monofunctional compounds, there may be used amino compounds, phenol compounds, halocarbonyl compounds, carboxylic acid compounds, epoxy compounds, isocyanate compounds, etc.

The polyester composition of the present invention can be prepared by dispersing component (B) in component (A) by conventional means so that a half width of an exothermic peak measured in a polyethylene terephthalate-crystallizing temperature range by means of a DSC at a gradual cooling rate of 10° C./min becomes 15° C. or less. In the composition, component (B) is used as a nucleating agent for component (A).

The DSC measurement can be conducted in a conventional manner by using a commercially available apparatus of, for example, model DSC II made by Perkin Elmer Co. For example, a sample weighing 8 mg as to component (A) is heated to a temperature higher than the melting point of component (A) in a nitrogenous atmosphere to completely melt the polyester sample comprising mainly polyethylene terephthalate, then cooled at a given rate to record an exothermic peak accompanied by the crystallization. Such differential measurement of polyethylene terephthalate shows that the exothermic peak resulting from crystallization appears in the range of from 180° C. to 210° C. when cooling is conducted at a rate of 10° C./min. However, this exothermic peak is usually so broad that "the half width of the peak" (that is, the width at a height one-half the distance from a base line to the top of the peak) is about 20° C. as shown in FIGURE.

When the cooling rate is accelerated, the exothermic peak based on the crystallization will further shift to the low temperature side, with the half width becoming broader and, at a cooling rate of 80° C./min, the exothermic peak generally shifts to from 150° C. to 160° C. with a half width of more than 30° C.

When the cooling rate is more accelerated, the exothermic peak based on the crystallization will become much broader until substantially no peak is observed.

Polyethylene terephthalate, which shows such a broad half width of exothermic peak based on the crystallization even in the above-described gradual cooling, will be cooled and solidified almost without crystallization in the portions brought into contact with a metal mold surface in molding using an ordinary metal mold, because the cooling rate of molten polyethylene terephthalate at the metal mold surface is as fast as 300°–400° C./min.

In contrast, the composition of the present invention shows an exothermic peak at from 200° C. to 220° C. based on crystallization in the course of cooling to conduct DSC measurement when cooled at a rate of 10° C./min, that is, it has a crystallizing temperature shifted to the higher temperature side. In addition, the exothermic peak is extremely sharp. The half width of this peak is at least not more than 15° C., preferably not more than 10° C. Compositions showing a half width of 8° C. or less have particularly excellent properties.

In cooling at a rate of 80° C./min, the composition of the present invention shows an exothermic peak between 170° C. and 210° C. based on the crystallization, with a half width of 22° C. or less, preferably 20° C. or less, and particularly preferably 18° C. or less.

Therefore, the composition of the present invention undergoes rapid crystallization even when rapidly cooled in a metal mold, thus providing well crystallized homogeneous moldings having good physical properties.

As is common with ordinary compositions, the composition of the present invention requires individual components constituting the composition to be uniformly dispersed therein. As a method for dispersing component (B) in component (A) in a highly fine-dispersed state, there is, for example, a method of first mechanically crushing, pulverizing or milling the solid aromatic polyamide, component (B), having been prepared by various known processes to form a super-fine or microfibril state, then mixing them with a solution of, or molten state, polyester comprising mainly polyethylene terephthalate. In the case of crushing component (B) by mechanical means until it exhibits sufficient effects as a nucleating agent, it is also possible to use a non-solvent for depressing heat generation or for aiding to attain uniform dispersion of component (B), or to crush in the presence of additives (e.g., plasticizers, inorganic fillers, lubricants, etc.) or polymers which have been conventionally used for polyethylene terephthalate.

The composition of the present invention can be also prepared by adding, to a solution in a solvent of component (B) prepared by known processes or a component (B) solution or suspension as produced in the production step, a poor solvent therefor to form a finely dispersed precipitate, isolating it by filtration or centrifugation, and mixing them with a solution of component (A) or in molten component (A) or, without isolation, by replacing the solvent by a solvent for polyethylene terephthalate and dissolving therein component (A) followed by causing co-precipitation in a poor solvent for polyethylene terephthalate.

Solvents that can be used in the step for dissolving or producing component (B) include high polar non-reactive solvents, for example, dimethylformamide, dimethylacetamide, tetramethylurea, hexamethylphosphoramide, N-methylpyrrolidone, N-methylcaprolactam, dimethyl sulfoxide, and the mixtures thereof. If necessary, mixtures with other solvents such as nitrobenzene, tetrahydrofuran, dioxane, tetrachloroethane, chloroform, phenol, etc., may also be used. Further, inorganic salts such as calcium chloride or lithium chloride may be added to raise the solubility thereof. As the solvent for dissolving component (B), formic acid, concentrated sulfuric acid or fuming sulfuric acid may also be used.

As the poor solvent, various solvents can be used, such as water, methanol, ethanol, acetone, ethylene glycol, hexane, o-chlorophenol, nitrobenzene, tetrachloroethane, phenol, etc., and the mixtures thereof, with water and methanol being preferable.

In dispersing component (B) in a finely dispersed state using the above-described solvents and poor solvents, desired size and form can be attained by properly selecting the concentration of the solution, combination of said solvent and poor solvent, and mechanical dispersing force upon mixing. Examples of the mechanical dispersing method include a method of using a high-speed stirrer, mixer, homogenizer or the like, a method of irradiating with ultrasonic waves, and a method of blowing component (B) into a poor solvent in a spray form.

Further, the composition of the present invention can be prepared by mixing the solution or dispersion of component (B), which is mixed with a poor solvent in the aforesaid process, with a dispersing aid, and mixing the resulting mixture with a poor solvent to cause co-precipitation of component (B) and the dispersing aid, or by dissolving in, or mixing with, a poor solvent a dispersing aid and mixing it with a solution or dispersion of component (B) to cause co-precipitation of component (B) and the dispersing aid, followed by mixing or kneading the co-precipitate as produced, or after filtration or washing, with component (A) in a dissolved or molten state.

The dispersing aid serves to prevent unnecessary aggregation to form large aggregates and solidification where only component (B) exists, and serves to facilitate dispersion of component (B) in polyethylene terephthalate in a finely dispersed state.

For the sake of convenience, the dispersing aids which are advantageous in surface property and physical properties of the resulting moldings when incorporated in component (A) are preferable, although those which cause no or only slight adverse effects can be used.

Examples of the dispersing aid include polyethylene terephthalate (and a copolymer thereof, starting material thereof and oligomers thereof), other polymers, plasticizers, surfactants, flame-retardants, antioxidants, stabilizing agents against heat or light, lubricants, reinforcing agents, extenders, etc. Specific examples of the dispersing aid include phosphoric esters (e.g., tricresyl phosphate, tris(2,3-dibromopropyl)phosphate, triphenyl phosphate, tributyl phosphate, etc.), esters (e.g., dibutyl phthalate, dimethyl terephthalate, dibutyl terephthalate, dipropyl terephthalate, dimethyl phthalate, di-2-ethylhexyl phthalate, dibutyl adipate, 2-ethylbutyl azelate, dioctyl sebacate, ethylene glycol dibenzoate, neopentyl glycol dibenzoate, triethylene glycol dibenzoate, butylphthalylbutyl glycolate, butyl p-acetylbenzoate, etc.), halides (e.g., chlorinated paraffin, tetrabromobutane, hexabromobenzene, decabromodiphenyl ether, tetrabromobisphenol, etc.), phenols (e.g., 2,6-di-tert-butyl-p-cresol, 2,2'-methylene-bis(4-methyl-6-tert-butylphenol), tetrakis(methylene-3-(3',5'-di-tert-butyl-4'-hydroxyphenyl)propionato)methane, p-octylphenyl salicylate, etc.), benzophenones (e.g., 2-hydroxy-4-methoxybenzophenone, 5-chloro-2-hydroxybenzophenone, etc.), metal salts (e.g., sodium laurate, potassium stearate, cadmium stearate, dibutyltin, lead maleate, calcium alkylbenzenesulfonate, etc.), alcohols (e.g., stearyl alcohol, polyoxyethylene nonylphenol ether, polyoxyethylene monocetyl ether, glycerol monostearate, etc.), polyesters or the oligomers thereof (e.g., polyethylene terephthalate and the copolymer thereof, bishydroxyethyl terephthalate, polybutylene terephthalate and the copolymer thereof, polyethylene adipate, polyethylene sebacate, polyhexamethylene terephthalate, polycaprolactone, etc.), polyamides (e.g., nylon 6, nylon 66, nylon 12, etc.), polycarbonates, polysulfones, polysulfides, silicon resins or silicone oil, vinyl polymers and copolymers (e.g., polymethacrylates, polyacrylates, ethylene-vinyl acetate copolymer, polystyrenes, etc.), polyoxytetramethylene, polyoxypropylene, polyoxyethylene, polyphosphazens, epoxy resins, cellulose polymers or oligomers (e.g., cellulose acetate, ethyl cellulose, nitrocellulose, etc.), and inorganic fibers and inorganic powders (e.g., glass fiber, carbon fiber, potassium titanate fiber, zinc borate, barium metaborate, silica, talc, titanium oxide, antimony oxide, etc.). These various materials are properly selected depending upon the purpose. Of these, particularly preferable dispersing aids are polymers (e.g., polyesters and the oligomers thereof, polymethacrylates, polystyrenes, cellulose acetate, etc.) and surfactants. The dispersing aid is used in an amount of from 0.5 to 10 parts by weight per part by weight of component (B).

The composition of the present invention can also be prepared by dispersing component (B) having been finely dispersed according to the aforesaid process, in a starting material for component (A) or an intermediate for the final polymer, and subjecting the resulting mixture to the first or intermediate step of polymerization to prepare component (A).

Of the above-described processes to finely disperse component (B) in component (A), preferable results are obtained by the process of using a dispersing aid.

Various other processes are also applicable as long as they enable the attainment of the objects of the present invention. Also, a process of using a composite of component (A) and component (B), obtained by the above-described process, as a master batch, and further blending or kneading it with component (A) to adjust the content of component (B) to a predetermined level is industrially advantageous.

Component (B) is extremely finely dispersed in the thus-obtained composite of components (A) and (B) of the present invention in the form of branched or intertwined microfibrils, complete fine microfibrils, needle-like or particulate state fundamentally having a size (diameter or length) of not more than 50 μm. Compositions providing preferable effects contain component (B) particles ranging from about several μm to about several ten Å in size.

As to blending ratio, component (A) and component (B) of the present invention are to be compounded so that the effect of accelerating crystallization of polyester comprising mainly polyethylene terephthalate is obtained, or that the half width of exothermic peak based crystallization by gradual cooling and measured by a DSC at a cooling rate of 10° C./min becomes 15° C. or less per 8 mg of said component (A). The weight ratio range of component (B) described above varies depending upon the properties of components (A) and (B) and the dispersed state (e.g., size, shape, etc.) of component (B), and hence it is difficult to show the blending ratio of component (A) to component (B) by weight, but, in general, from 0.05 to 10 parts by weight, and preferably from 0.1 to 5 parts by weight, of component (B) is compounded with 100 parts by weight of component (A). In the case of using component (A), e.g., polyethylene terephthalate, as the dispersing aid, component (B) is blended in the above amount based on 100 parts by weight of the total component (A) in the resulting polyester composition.

When component (B) is incorporated in component (A) in a homogeneous, finely dispersed state, the amount of component (B) may be not more than 3 parts by weight, with 0.1 to 3 parts by weight being the most preferable.

The composition of the present invention containing components (A) and (B) as necessary components may further contain various additives such as reinforcing fillers, plasticizers, antioxidants, UV ray-absorbing agents, lubricants, parting agents, flame-retardants, antistatics, colorants, etc., according to the end-use.

The thus-obtained composition of the present invention is suited as a molding material, showing good molding properties in molding in a low-temperature (not higher than 120° C., preferably around 100° C.) metal mold as well as in molding in a high-temperature metal mold.

In molding, combined use of the composition of the present invention and a reinforcing filler is extremely effective for improving shape stability, heat resistance, and mechanical characteristics of resulting moldings, with maintaining the original merits of the composition of the present invention, thus being particularly preferable. As such reinforcing filler, there are illustrated fibrous materials such as glass fiber, potassium titanate fiber, asbestos fiber, poly-p-phenyleneterephthalamide fiber, carbon fiber, etc., and non-fibrous inorganic materials such as mica, aluminum silicate, glass beads, glass flake, silica, talc, etc. Of these, glass fiber is particularly preferable. The amount of the reinforcing fiber to be compounded varies depending upon the desired end-use, but, in general, it ranges from 2 to 200 parts by weight, and preferably 4 to 100 parts by weight, per 100 parts by weight of component (A). If the amount is less than 2 parts by weight, sufficient effects of improving form stability or physical properties are not obtained, whereas if it is more than 200 parts by weight, deterioration results, such as in increased fragility and deteriorated molding properties.

In the present invention, combined use of a plasticizer is preferable for improving molding properties and surface lubricity of the resulting moldings (that is, molded articles formed from the polyester composition of the invention). As such plasticizers, appropriate plasticizers may be selected from various known compounds. Examples thereof include phosphates (e.g., triphenyl phosphate, tricresyl phosphate, tricyclohexyl phosphate, triisopropyl phosphate, octyldiphenyl phosphate, triethyl phosphate, etc.), phosphites (e.g., triphenyl phosphite, tributyl phosphite, trimethyl phosphite, etc.), phosphonates (e.g., phenyl phenylphosphonate, diphenyl phenylphosphonate, etc.), phosphines (e.g., phenylphosphinic acid, methyl dimethylphosphinate, phenyl methylphosphinate, etc.), benzoic esters (e.g., polyethylene glycol dibenzoate, polypropylene glycol dibenzoate, polytetramethylene glycol dibenzoate, diethylene glycol dibenzoate, triethylene glycol dibenzoate, dipropylene glycol dibenzoate, neopentyl glycol dibenzoate, glyceryl tribenzoate, trimethylolethane tribenzoate, phenyl benzoate, pentaerythritol tetrabenzoate, bishydroxyethyl terephthalate dibenzoate, etc.), esters (e.g., dioctyl phthalate, diisodecyl phthalate, diisopropyl isophthalate, di-2-ethylhexyl isophthalate, etc.), polyesters (e.g., ethylene adipate/terephthalate copolyester, propylene adipate/terephthalate copolyester, etc.) and the oligomers thereof, epoxy compounds obtained from phenols (e.g., hydroquinone, resorcin, pyrogallol, 4,4'-dihydroxydiphenyldimethylmethane, 4,4'-dihydroxydiphenyldimethylsulfone, etc.) and epichlorohydrin, epoxy compounds obtained from alcohols (e.g., 1,4-butanediol, 1,6-hexanediol, glycerin, pentaerythritol, diethylene glycol, polyethylene glycol, polytetramethylene glycol, etc.) and epichlorohydrin, epoxy compounds obtained from carboxylic acids (e.g., adipic acid, succinic acid, isophthalic acid, terephthalic acid, etc.) and epichlorohydrin, polyoxyalkylenes (e.g., polyoxyethylene, polyoxypropylene, polyoxybutylene, etc.), benzophenone, 4-fluorobenzophenone, diphenylsulfone, N-ethyl-o,p-toluenesulfonamide, tolylsulfoxide, laurylnitrile, erucylnitrile, etc.

The composition of the present invention contains component (A) and component (B) as necessary components, with component (B) showing a nucleating effect of accelerating crystallization of component (A). Therefore, the composition of the present invention enables the conducting of molding, and particularly injection-molding, at a metal mold temperature of less than 120° C., and particularly at about 100° C., which has been impossible with conventional polyethylene terephthalate, as well as to conduct molding in a high-temperature metal mold. Thus, it has the great significance of expanding the application range of polyethylene terephthalate as an industrially useful resin, in cooperation with its desirable heat resistance and chemical resistance properties.

In addition, the composition can find application as a material for film, fiber, or like molding obtained by extrusion molding or blow molding.

The present invention will now be described in more detail by reference to Examples. Additionally, DSC measurement, molding, and evaluation of sample pieces were conducted as follows.

(1) DSC measurement

Samples containing 8 mg of component (A) were used: for example, even in the case of compounding glass fiber, samples containing 8 mg as component (A) were weighed out for use. As a measuring apparatus, Model DSC-II manufactured by Perkin Elmer Co. was used. Measurement was conducted in a nitrogenous atmosphere as follows. Samples were heated to 290° C., and, after maintaining at that temperature for 5 minutes, cooled at a definite rate of 10° C./min. Exothermic peak temperature (Tc) and half width ($\Delta T$) of the peak were determined from the exothermic peak obtained based on crystallization of component (A), as shown in FIGURE.

(2) Kneading by means of a biaxial screw extruder

Components (A) and (B) and, if necessary, other additives were blended in given proportions in a rotary drum blender. The resulting blend was pelletized by extruding at from 260° C. to 270° C. using a 30-mm biaxial screw extruder. The thus-obtained pellets were vacuum-dried at 130° C. for 5 hours.

(3) Kneading by means of a uniaxial screw extruder

Samples with a predominant compounding ratio were blended in a rotary drum blender and pelletized by extruding at 260° C. using a uniaxial screw extruder. The resulting pellets were vacuum-dried at 130° C. for 5 hours.

(4) Molding of sample pieces

The pellets obtained in (2) or (3) described above were molded using model KC-20 made by Kawaguchi Tekko K.K. under molding conditions of 270° C. to 280° C. in cylinder temperature, a given temperature in metal mold temperature, and a molding cycle of 25 seconds.

(5) Parting properties and appearance

Parting properties were evaluated based on the ease with which the molding was taken out of the cavity and with which a sprue was removed. Appearance was evaluated based on the surface gloss and presence or absence of pock marks, as follows:
A: good; B: fairly good; x: unsatisfactory (6) Measurement of tensile strength Dumbell specimens (dumbbell type-1 of ASTM) were molded according to process (4), and tensile strength was measured according to ASTM-D-638 using them.

Observation of component (B) in the composition

A slight amount of the composition obtained in each Example was sandwiched between cover glasses, placed on a hot plate, heated to from 270° C. to 300° C. to melt, and pressed while in a molten state to reduce the thickness.

(1) When rapidly cooled between cool black bodies, polyethylene terephthalate in the composition was maintained in an amorphous state without crystallization. The thus-obtained samples were observed under a polarizing microscope.

(2) Further, each of the samples was subjected to a heating stage and was observed under the polarizing microscope while heating it.

Results obtained are as follows: In observation (2), component (B) was not melted in every Example, and the size and shape of particles thereof were recognized in both the case of heating the composition from 270° C. to 300° C. after melting component (A) of polyethylene terephthalate and the case of heating to higher than 300° C. (to about 310° C.).

Observations were made of the size, shape, and dispersed state of component (B) according to (1) and (2) described above with 100–300× magnification.

Results thus obtained were categorized into the following types:

(a): Strand-like, needle-like, cotton-like or flake-like matter of 2 to 3 μm in width was observed, with extremely fine particulate matter (not larger than 1 μm) existing in a dispersed state;

(b): Particles of indefinite or particulate form were predominant, most of which were as small as 1 μm or less and were dispersed;

(c): Particles of indefinite or particulate form having a size of about 5 to 10 μm and, in some cases, about 20 to 30 μm, were observed here and there, and particles of 2 or 3 μm or less than 1 μm were dispersed; and (d): Strand-like matter of about 1 to 3 μm was predominant, and other smaller strand-like, cotton-like or particulate matter were dispersed.

Results of the observations of the compositions in Examples, categorized by the above-described types, are as follows:

Compositions of type (a): Examples 1, 3, 4, 11 and 12
Compositions of type (b): Examples 6 to 10 and 15 to 17
Compositions of type (c): Examples 2, 13 and 14
Composition of type (d): Example 5

REFERENCE EXAMPLE 1

Polyethylene terephthalate having a reduced specific viscosity ($\eta sp/c$) of 0.61 (measured in a tetrachloroethane/phenol (4/6) mixture solvent) was dried to measure the exothermic peak temperature and half width of the peak based on crystallization thereof by DSC measurement. Particularly, when 8 mg of the polyethylene terephthalate was heated at a heating rate of 10° C./min, an endothermic peak of melting point (Tm) was observed at 255° C. Heating was further continued to 290° C. and, after maintaining this temperature for 5 minutes, the polymer was cooled at a rate of 10° C./min. The relation between the temperature and calorific value is generally shown by the curve of FIGURE. Half width of the exothermic peak was determined from the graph as follows. The exothermic peak temperature (Tc) based on crystallization was read 181° C. Width of the peak was measured as the width between two points corresponding to $\frac{1}{2}$ of the height of the peak (h). This width was regarded as the half width ($\Delta T$) of the exothermic peak. As a result, $\Delta T$ was found to be 19° C.

When the measurement was repeated by changing the cooling rate to 80° C./min, Tc was shifted to 150° C. and $\Delta T$ expanded to as broad as 36° C.

When this polyethylene terephthalate was molded in metal mold at 100° C., 110° C. and 120° C., there resulted extremely poor parting properties (evaluated as X) and rough appearance of the molding (evaluated as X). Moldings with passable parting properties and good appearance (evaluated as A) were obtained only by raising the metal mold temperature to 150° C.

REFERENCE EXAMPLE 2

A 30 wt% amount of glass fiber (glass chipped strand of 3 mm in length) was kneaded with polyethylene terephthalate (PET) of 0.72 in $\eta sp/c$ using a uniaxial extruder. The same test proceudres as in Reference Example 1 were conducted to obtain results reported below in Table 1.

REFERENCE EXAMPLE 3

2 kg of polyethylene terephthalate having an $\eta sp/c$ of 0.61, 60 g of talc, and 880 g (30%) of glass fiber were kneaded in a uniaxial screw extruder and molded. The thus-obtained moldings were evaluated to obtain the results reported in Table 1.

REFERENCE EXAMPLE 4

2 kg of polyethylene terephthalate having an $\eta sp/c$ of 0.72, 40 g of talc, and 880 g (30%) of glass fiber were kneaded in a uniaxial screw kneader and molded. The thus-obtained moldings were evaluated to obtain the results reported in Table 1.

TABLE 1

| Reference Example No. | PET $\eta sp/c$ | Metal Mold Temp. (°C.) | DSC Tc | DSC $\Delta T$ | Parting Properties | Appearance | Tensile Strength (kg/cm$^2$) |
|---|---|---|---|---|---|---|---|
| 2 | 0.72 | 100 | 185 | 23 | x | x | — |
|   |      | 110 |     |    | x | x | — |
|   |      | 120 |     |    | x | x | — |
|   |      | 150 |     |    | A | A | 1,360 |
| 3 | 0.61 | 100 | 201 | 16 | x | x | — |
|   |      | 110 |     |    | x | x | — |

TABLE 1-continued

| Reference Example No. | PET ηsp/c | Metal Mold Temp. (°C.) | DSC Tc | DSC ΔT | Parting Properties | Appearance | Tensile Strength (kg/cm²) |
|---|---|---|---|---|---|---|---|
| | | 120 | | | x | x | — |
| | | 150 | | | A | A | 1,060 |
| 4 | 0.72 | 100 | 198 | 17 | x | x | — |
| | | 110 | | | x | x | — |
| | | 120 | | | x | x | — |
| | | 150 | | | A | A | 1,350 |

EXAMPLE 1

(1) A 1-liter reactor equipped with a high-speed stirrer was well dried by introducing hot dry nitrogen gas thereinto, and then cooled. 100 ml of dry, purified hexamethylphosphoramide, 150 ml of N-methyl-2-pyrrolidone, and 8 g of anhydrous lithium chloride were charged therein, and 2.25 g of p-phenylenediamine was added thereto and completely dissolved therein. Then, this solution was cooled to 5° C. to 10° C., and, under vigorous stirring, 4.27 g of terephthalic acid dichloride was added thereto. After reacting for about 1 hour, the temperature of the solution was raised to 30° C. to 40° C., reaction being continued for another 1 hour.

A part of the thus-produced poly-p-phenyleneterephthalamide was removed from the reaction system, precipitated in water, repeatedly washed with warm water, and dried for measuring viscosity. As a result, relative viscosity ($\eta$rel) measured at 35° C. as a 0.2 g/100 ml solution in 97% concentrated sulfuric acid was found to be 1.90, and the mean polymerization degree about 80.

(2) 25 g of bishydroxyethyl terephthalate (i.e., polyethylene terephthalate oligomer) was dissolved as a dispersing aid under heating in the above-described reaction mixture, and the resulting mixture was poured into about 3 liter of water under vigorous stirring, and the solid thus-formed was filtrated out, washed with water, dried, and well comminuted. The amount of 28 g of resulting solid contained 16.5% poly-p-phenyleneterephthalamide component insoluble in nitrobenzene. 25 g of this solid was well mixed with 400 g of polyethylene terephthalate used in Reference Example 1, and sufficiently kneaded in a molten state. The thus-obtained kneaded material contained about 0.96% poly-p-phenyleneterephthalamide insoluble in o-chlorophenol. This composition had a Tc of 221° C. measured by DSC at a cooling rate of 10° C./min. The exothermic peak in this temperature range was as sharp as 5.7° C. in ΔT. Also, DSC measurement of the product at a cooling rate of 80° C./min gave a Tc of 196° C. and ΔT of 14.5° C. When the product was molded in a 110° C. metal mold, there were obtained moldings with good parting properties and good appearance (both evaluated as A).

(3) The same procedures as described above were repeated on a 5-fold scale except for using polyethylene terephthalate of 0.82 in ηsp/c and kneading by means of a biaxial screw extruder. Then, the kneaded product was kneaded with a 30 wt% amount of glass fiber in a uniaxial screw extruder. When the thus-kneaded product was molded in a 110° C. metal mold, the results reported in Table 2 were obtained.

EXAMPLE 2

(1) 150 ml of N-methylpyrrolidone, 100 ml of N,N-dimethylacetamide, and 2.15 g of p-phenylenediamine were charged in the reactor used in Example 1-(1) and, after dissolving the mixture, 4.44 g of terephthalic acid dichloride was added thereto at 5° C.–10° C. under vigorous stirring followed by reacting for 2 hours.

A part of this reaction product was removed and subjected to viscosity measurement in the same manner as in Example 1-(1). As a result, relative viscosity ($\eta$rel) was found to be 0.90, and mean polymerization degree about 10.

To the remaining reaction mixture was added, under heating and vigorous stirring, a solution of 50 g of neopentyl glycol dibenzoate in N,N-dimethylacetamide. Then, this mixture was mixed with a solution of 25 g of polyethylene terephthalate in o-chlorophenol under vigorous stirring followed by pouring thereinto about 2 liter of methanol. The precipitate thus-formed was collected by filtration, washed with methanol, dried under reduced pressure, and well sprinkled on 325 g of polyethylene terephthalate used in Reference Example 1 followed by well kneading. The thus-obtained composition contained about 1.3% o-chlorophenol-insoluble poly-p-phenyleneterephthalamide. DSC measurement revealed that Tc and ΔT of this composition measured at a cooling rate of 10° C./min were 212° C. and 5.4° C., respectively, and Tc and ΔT measured at a cooling rate of 80° C./min were 192° C. and 13.4° C., respectively. When the composition was molded in a 110° C. metal mold, moldings with good parting properties and good appearance (both evaluated as A) were obtained.

(2) The same procedures as described above were conducted on a 10-fold scale, except for using polyethylene terephthalate of 0.72 in ηsp/c, and kneading by means of a biaxial screw extruder. Then, 70 parts of the kneaded product were kneaded with 30 parts of glass fiber in a uniaxial screw extruder. The thus-obtained resin was molded and the results reported in Table 2 were obtained.

EXAMPLE 3

(1) Reaction was conducted in the same manner as in Example 1-(1), except for using a mixture consisting of 80 mol% of p-phenylenediamine and 20 mol% of 4,4'-diaminodiphenyl instead of p-phenylenediamine. After adding to the reaction mixture 100 ml of hexamethylphosphoramide and 150 ml of N-methylpyrrolidone under heating, the resulting mixture was mixed with a solution of 40 g of polyethylene terephthalate in about 800 ml of o-chlorophenol under vigorous stirring. The resulting mixture was poured into a large amount of methanol, comminuted in a mixer, collected by filtration, and washed with methanol. After drying, the product was well mixed and kneaded with 660 g of polyethylene terephthalate used in Reference Example 1. This composition contained about 0.7% aromatic polyamide component. DSC measurement revealed that Tc and ΔT of this composition measured at a cooling rate of 10° C./min were 219° C. and 5.8° C., respectively, and that Tc and ΔT measured at a cooling rate of 80° C./min were 188° C. and 12.9° C., respectively. When the composition was molded in a 110° C. metal mold, moldings with good parting properties and good appearance (both evaluated as A) were obtained.

(2) The same procedures as in (1) were conducted on a 4-fold scale, except for using polyethylene terephthalate of 0.72 in ηsp/c and kneading by means of a biaxial screw extruder. Then, 65 parts of this kneaded product was kneaded with 35 parts of glass fiber in a uniaxial screw extruder. The thus-obtained resin was molded and the results reported in Table 2 were obrained.

TABLE 2

| Example | DSC Tc (°C.) | DSC ΔT (°C.) | Metal Mold Temperature (°C.) | Parting Properties | Appearance of Moldings | Tensile Strength (kg/cm$^2$) |
|---|---|---|---|---|---|---|
| 2-(2) | 210 | 5.9 | 110 | A | A | 1,550 |
| 3-(2) | 212 | 6.2 | 110 | A | A | 1,580 |
| 1-(3) | 218 | 5.8 | 110 | A | A | 1,420 |

EXAMPLE 4

(1) 14 g of commercially available poly-p-phenyleneterephthalamide fiber (trade name: Kevler) was dissolved in 200 ml of 99.8% concentrated sulfuric acid. After dissolving therein 20 g of dodecylbenzenesulfonic acid and 20 g of polyoxyethylene nonylphenol as co-precipitating agents, the resulting mixture was poured into a large amount of water under vigorous stirring. The precipitate thus-formed was collected by filtration, washed with water, and dispersed in methanol followed by replacing the solvent by nitrobenzene. After dissolving therein 50 g of polyethylene terephthalate, the mixture was again poured into a large amount of methanol to coprecipitate. The precipitate thus-formed was washed with methanol, dried, and well mixed and kneaded with 650 g of polyethylene terephthalate used in Reference Example 1. The thus-kneaded composition contained about 1.9% aromatic polyamide component. DSC measurement revealed that Tc and ΔT of this composition measured at a cooling rate of 10° C./min were 217° C. and 5.5° C., respectively, and that Tc and ΔT at a cooling rate of 80° C./min were 185° C. and 14.2° C., respectively.

(2) When the resin obtained in (1) was molded in a 120° C. metal mold, moldings with good parting properties and good appearance (evaluated as A) were obtained.

EXAMPLE 5

Poly-p-phenyleneterephthalamide was spun from a concentrated sulfuric acid solution according to a known process. The resulting filaments (6 to 8 μm in diameter) were cut into 0.1 to 0.15-mm long pieces, beaten in an iron mortar, mixed with an about 3-fold amount of glass fiber, crushed in a finely crushing hammer mill, and milled for 5 days and 5 nights in a ball mill in the presence of N-methylpyrrolidone. The thus-milled product was dispersed in chlorophenol, and 50 g of polyethylene terephthalate used in Reference Example 1 was dissolved therein followed by coprecipitation in methanol. The composition obtained by washing with methanol and drying contained about 2.8% aromatic polyamide component (about 11.2% as o-chlorophenol insolubles). DSC measurement revealed that Tc and ΔT of this composition measured at a cooling rate of 10° C./min were 215° C. and 5.9° C., respectively, and that Tc and ΔT at a cooling rate of 80° C./min were 185° C. and 14.5° C., respectively.

EXAMPLE 6

19.83 g of 4,4'-diaminodiphenylmethane was reacted with 20.81 g of terephthalic acid dichloride in the same manner as in Example 2-(1) using 1 liter of hexamethylphosphoramide, 1.5 liter of N-methylpyrrolidone (solvent), and 75 g of lithium chloride. To the reaction mixture were added as dispersing aids 20 g of polystyrene and 50 g of polyethylene terephthalate/adipate (molar ratio of terephthalic acid to adipic acid=55/45) to dissolve. This solution was poured into a large amount of water, and the precipitate thus-formed was collected by filtration, washed, dried, and kneaded with 2.5 kg of polyethylene terephthalate (ηsp/c=0.75) and 50 g of neopentyl glycol dibenzoate in a biaxial screw extruder. The thus-kneaded product is then kneaded with 1 kg of glass fiber in a uniaxial screw extender, and the resulting resin was molded in a 110° C. metal mold. Results thus-obtained are shown in Table 3.

EXAMPLES 7–10

The same procedures as in Example 6 were conducted except for changing the diamine component, dicarboxylic acid component, and dispersing aid. Results thus-obtained are tabulated in Table 3.

TABLE 3

| Example | Diamine Component | Dicarboxylic Acid Component | Dispensing Aid (molar ratio) | DSC Tc (°C.) | DSC ΔT (°C.) | 1* | 2* | Tensile Strength (kg/cm$^2$) |
|---|---|---|---|---|---|---|---|---|
| 6 | NH$_2$—⌬—CH$_2$—⌬—NH$_2$  19.83 g | ClOC—⌬—COCl  20.81 g | Polystyrene 20 g  Polyethylene terephthalate/ adipate (55/45) 50 g | 213 | 5.9 | A | A | 1,590 |
| 7 | NH$_2$—⌬—NH$_2$  10.61 g | ClOC—⌬(COCl)  20.81 g | Polyethylene terephthalate/ sebacate (60/40) 70 g | 209 | 6.7 | A | A | 1,610 |
| 8 | NH$_2$—⌬—O—⌬—NH$_2$  20.02 g | ClOC—⌬—⌬—COCl  8.37 g | Polyethylene/ butylene terephthalate 30 g | 212 | 5.9 | A | A | 1,560 |

TABLE 3-continued

| Example | Diamine Component | Dicarboxylic Acid Component | Dispensing Aid (molar ratio) | DSC Tc (°C.) | ΔT (°C.) | 1* | 2* | Tensile Strength (kg/cm²) |
|---|---|---|---|---|---|---|---|---|
| | | ClOC—⌬—COCl  20.30 g | Polymethyl methacrylate 30 g | | | | | |
| 9 | NH₂—⌬—SO₂—⌬—NH₂  24.83 g | ClOC—⌬—OCH₂CH₂O—  —⌬—COCl  34.93 g | Polyethylene terephthalate/ polytetra- methylene glycol copolymer 30 g (PTMG 50%) | 208 | 6.2 | A | A | 1,570 |
| 10 | NH₂—⌬⌬—NH₂  15.82 g | COCl  ClOC—⌬  20.81 g | Cellulose diacetate 20 g Polyethylene terephthalate/ adipate (60/40) | 207 | 6.8 | A | A | 1,620 |

*1 Parting properties
*2 Appearance of moldings
EG, BD, and PTMG represent ethylene glycol component, 1,4-butanediol component, and polytetramethylene glycol component, respectively.

EXAMPLE 11

(1) A 1-liter reactor equipped with a stirrer, nitrogen gas inlet, and condenser was well dried by introducing hot dry nitrogen gas thereinto, and then cooled. 400 ml of dry, purified N-methylpyrrolidone, 110 ml of pyridine, 20 g of lithium chloride, 12 ml of triphenyl phosphite, and 28 g of p-aminobenzoic acid were charged therein, dissolved at room temperature, and heated to 80° C. to cause polymerization. The reaction was conducted four times changing the reaction time. After completion of the reaction, the reaction solution was removed, partly or wholly (as indicated in Run Nos. 1–4 below), of the reactor and mixed with water to precipitate produced aromatic polyamide. The precipitate thus-formed was purified, dried, and dissolved in 98% sulfuric acid to measure the viscosity at 30° C. in a concentration of 0.5 g/dl. The results thus-obtained are shown below.

| Run No. | Reaction Time (hr) | Relative Viscosity at 30° C. |
|---|---|---|
| 1 | 1.5 | 1.14 |
| 2 | 2.5 | 1.45 |
| 3 | 3.5 | 1.69 |
| 4 | 4.5 | 2.30 |

(2) A solution prepared by diluting about 70 ml of the aromatic polyamide reaction solution (Run No. 4) synthesized in (1) above with 100 ml of N-methylpyrrolidone, was mixed wih a solution of 310 g of polyethylene therephthalate used in Reference Example 1 in 5 liters of o-chlorophenol under vigorous stirring. This mixture was then added to a large amount of excess methanol followed by stirring. The precipitate thus-obtained were repeatedly washed with methanol, then with water, and dried. A part of this composition was redissolved in o-chlorophenol, and insolubles were separated, dried, and weighed. IR abosrption spectrum and elemental analysis revealed that the insolubles were polybenzamide, which were contained in a proportion of 0.98%. DSC measurement revealed that Tc of this composition measured at a cooling rate of 10° C./min was 215° C., and revealed a sharp exothermic peak having a ΔT value of 6.0.

EXAMPLE 12

About 100 ml of the reaction solution of polybenzamide obtained in Run No. 3 of Example 11 was diluted with 100 ml of N-methylpyrrolidone, and about 20 g of bishydroxyethyl terephthalate (polyethylene terephthalate oligomer) was dissolved therein by heating. Then, this solution was mixed with 500 ml of a nitrobenzene solution containing 20 g of polyethylene terephthalate, and mixed with a large amount of methanol to form a precipitate. The precipitate thus-formed was washed with successive, methanol and water, and mixed with polyethylene terephthalate oligomer followed by condensation reaction to obtain a highly polymerized polyethylene terephthalate composition. Polyethylene terephthalate in this composition had a viscosity (ηsp/c) of 0.66. When polyethylene terephthalate in the composition was dissolved in o-chlorophenol to isolate insolubles, the insolubles were identified as polybenzamide, which were contained in an amount of 1.75%. DSC measurement revealed that Tc and ΔT of this composition measured at a cooling rate of 10° C./min were 216° C. and 7.4° C., respectively.

EXAMPLE 13

3 g of polybenzamide obtained in Run No. 2 of Example 11 was dissolved in 200 ml of 99% concentrated sulfuric acid, and 20 ml of polyoxyethylene p-nonylphenol ether was added thereto and dissolved therein. This mixture was added to cold water under vigorous stirring to form a precipitate. The thus-obtained precipitate was washed with water, repeatedly washed with methanol, washed with ethylene glycol, and formed into a slurry in ethylene glycol. This slurry was mixed with bishydroxyethyl terephthalate (polyethylene terephthalate oligomer) followed by conducting polymerization. Thus, there was obtained 60 g of a polymer mixture, most of which was o-chlorophenol-soluble polyethylene terephthalate, with the content of o-chlorophenol insolubles (polybenzamide) being about 4.7%. Then, 210 g of polyethylene terephthalate used in Reference Example 1 was blended in a molten state with 50 g of the above-described polybenzamide-containing polyethylene terephthalate. The content of polybenzamide (o-chlorophenol insolubles) in the thus-obtained polyethylene terephthalate composition was 0.9%. DSC measurement of this composition revealed that Tc and ΔT measured at a cooling rate of 10° C./min were 211° C. and 6.2° C., respectively.

EXAMPLE 14

5 g of polybenzamide prepared in Run No. 1 of Example 11 was dissolved in a mixture solvent of 150 ml of dimethylacetamide, 250 ml of hexamethylphosphoramide, and 20 g of lithium chloride and, further, 10 g of ethylene/vinyl acetate copolymer, 10 g of ethylene glycol dibenzoate, and 5 g of bisphenol type epoxy resin. Then, this mixture solution was mixed with 400 ml of an o-chlorophenol/m-cresol mixture (weight ratio=1/1), and the resulting solution was vigorously mixed with a methanol/water mixture solution (weight ratio=about 3/1) to form a precipitate. The thus-obtained precipitate was washed with successive, methanol and water, then dried. The dried precipitate was kneaded with 460 g of polyethylene terephthalate used in Reference Example 1. The resulting composition contained about 1.0% polybenzamide (insoluble in o-chlorophenol and ethyl acetate). DSC measurement of this composition revealed that Tc and ΔT measured at a cooling rate of 10° C./min were 214° C. and 5.9° C., respectively. When this composition was molded in a 110° C. metal mold, there were obtained moldings with good parting properties and good appearance (both evaluated as A).

EXAMPLE 15

400 ml of dimethylacetamide was charged in the same reactor as used in Example 11, and a mixture of 32 g of p-aminobenzoyl chloride hydrochloride and 8 g of m-aminobenzoyl chloride hydrochloride was added thereto. The reaction was conducted at 0° C. for about 2 hours. After completion of the reaction, water was added thereto to form a precipitate. The precipitate was isolated, washed with water, and dried. The thus-obtained aromatic polyamide had a logarithmic viscosity of 0.18 measured in a 98% sulfuric acid solution. 4 g of this aromatic polyamide was dissolved in a mixture of 400 ml of hexamethylphosphoramide, 50 ml of dimethyl sulfoxide, and 10 g of calcium chloride. The resulting mixture was mixed with a nitrobenzene solution of 20 g of polyethylene terephthalate used in Reference Example 1, then with methanol. The resulting precipitate was washed, dried, and kneaded with 500 g of polyethylene terephthalate used in Reference Example 1. The thus-obtained composition contained 0.76% the aromatic polyamide. DSC measurement of this composition revealed that Tc and ΔT measured at a cooling rate of 10° C./min were 210° C. and 7.2° C., respectively. When this composition was molded in a 120° C. metal mold, moldings with good parting properties and good appearance (both evaluated as A) were obtained.

EXAMPLE 16

15 g of the polybenzamide obtained in Run No. 2 of Example 11 was dissolved in 2.5 liters of N-methylpyrrolidone, and 75 g of polyethylene terephthalate/adipate (molar ratio of terephthalic acid to adipic acid=55/45) was added thereto and dissolved therein as a dispersing aid. The resulting solution was poured into a large amount of water. The precipitate thus-formed was washed, dried, and kneaded with 1.3 kg of polyethylene terephthalate (ηsp/c=0.72) in a biaxial screw kneader. Furthermore, the thus-kneaded product was kneaded with 590 g of glass fiber in a uniaxial screw extruder. The thus-obtained resin was molded in a 110° C. metal mold. The results obtained are reported in Table 4 below.

EXAMPLE 17

18 g of the aromatic polyamide synthesized in the same manner as in Example 15 was dissolved in 2.5 liters of dimethylacetamide, and 20 g of polystyrene and 50 g of polyethylene terephthalate/sebacate (molar ratio of terephthalic acid to sebacic acid=60/40) were added thereto and dissolved therein as dispersing aids. The resulting solution was poured into a large amount of water. The precipitate thus-formed was washed, dried, and subjected to the same procedures as in Example 16. The results obtained are reported in Table 4 below.

TABLE 4

| Example | Tc (°C.) | ΔT (°C.) | Metal Mold Temperature (°C.) | Parting Properties | Appearance of Molding | Tensile Strength (kg/cm²) |
|---|---|---|---|---|---|---|
| 16 | 209 | 6.5 | 110 | A | A | 1,530 |
| 17 | 209 | 7.1 | 120 | A | A | 1,560 |

While the invention has been described in detail and with reference to specific embodiments thereof, it will be apparent to one skilled in the art that various changes and modifications can be made therein without departing from the spirit and scope thereof.

What is claimed is:
1. An injection moldable polyester composition having an increased crystallization rate comprising:
(A) 100 parts by weight of a polyester comprising mainly polyethylene terephthalate and having a reduced specific viscosity (ηsp/c) of at least 0.3; and
(B) from 0.1 to 5 parts by weight of at least one wholly aromatic polyamide, as a nucleating agent, having a melting point of at least 300° C. and containing at least one of (1) a diamine group represented by the formula (I)

—NH—Ar₁—NH—     (I)

wherein Ar₁ represents a divalent aromatic group; (2) a dicarboxylic acid group represented by the formula (II)

—CO—Ar₂—CO—     (II)

wherein Ar₂ represents a divalent aromatic group; and (3) an aminocarboxylic acid group represented by the formula (III)

—NH—Ar₃—CO—     (III)

wherein Ar₃ represents a divalent aromatic group, linked to each other through amido bonds,
wherein said component (B) is uniformly dispersed as a distinct phase in said component (A), after blending with component (A), in a substantial size of 50

μm or less, and a half width of an exothermic peak of the polyester composition measured in a crystallization temperature range by a differential scanning calorimeter at a cooling rate of 10° C./min is 15° C. or less per 8 mg of component (A), whereby the crystallization rate of said polyester comprising mainly polyethylene terephthalate is increased.

2. A composition as in claim 1, wherein said half width is 10° C. or less.

3. A composition as in claim 1, which further contains from 2 to 200 parts by weight of (C) reinforcing fiber per 100 parts by weight of component (A).

4. A composition as in claim 3, wherein said reinforcing fiber (C) is glass fiber.

5. A process for preparing a polyester composition comprising (A) 100 parts by weight of a polyester comprising mainly polyethylene terephthalate and having a reduced specific viscosity (ηsp/c) of at least 0.3; and (B) from 0.05 to 10 parts by weight of at least one aromatic polyamide containing at least one of (1) a diamine group represented by the formula (I)

—NH—Ar$_1$—NH—     (I)

wherein Ar$_1$ represents a divalent aromatic group; (2) a dicarboxylic acid group represented by the formula (II)

—CO—Ar$_2$—CO—     (II)

wherein Ar$_2$ represents a divalent aromatic group; and (3) an aminocarboxylic acid group represented by the formula (III)

—NH—Ar$_3$—CO—     (III)

wherein Ar$_3$ represents a divalent aromatic group, linked to each other through amido bonds,
which comprises dissolving or suspending said at least one aromatic polyamide in a solvent, mixing therewith from 0.5 to 10 parts by weight, per part by weight of said aromatic polyamide, of a dispersing aid, causing co-precipitation of said aromatic polyamide and said dispersing aid and dispersing the precipitate in a polyester comprising mainly polyethylene terephthalate having a reduced specific viscosity (ηsp/c) of at least 0.3.

6. A process for manufacturing moldings by melting a polyester comprising mainly polyethylene terephthalate and having a reduced specific viscosity (ηsp/c) of at least 0.3 and molding it using an injection mold, which comprises, to increase the crystallization rate of said polyester, uniformly dispersing as a distinct phase which is present after blending in said polyester, in a substantial size of 50 μm or less, prior to said melting procedure, from 0.1 to 5 parts by weight, per 100 parts by weight of said polyester, of at least one wholly aromatic polyamide, as a nucleating agent, having a melting point of at least 300° C. and comprising at least one of (1) a diamine group represented by the formula (I)

—NH—Ar$_1$—NH—     (I)

wherein Ar$_1$ represents a divalent aromatic groups; (2) a discarboxylic acid group represented by the formula (II)

—CO—Ar$_2$—CO—     (II)

wherein Ar$_2$ represents a divalent aromatic group; and (3) an aminocarboxylic acid group represented by the formula (III)

—NH—Ar$_3$—CO—     (III)

wherein Ar$_3$ represents a divalent aromatic group, linked to each other through amido bonds, so that a half width of an exothermic peak of the resulting polyester composition measured in a crystallization range by a differential scanning calorimeter at a cooling rate of 10° C./min is 15° C. or less per 8 mg of said polyester.

7. A process as in claim 6, wherein molding is conducted at a metal mold temperature of 120° C. or less.

8. A composition as in claim 3, wherein the amount of reinforcing fiber is from 4 to 100 parts by weight per 100 parts by weight of component (A).

9. A composition as in claim 1, which contains 0.1 to 3 parts by weight of said aromatic polyamide component (B) per 100 parts by weight of component (A).

10. A composition as in claim 1, wherein said component (B) is uniformly dispersed in said component (A) in a substantial size of 3 μm or less.

11. A composition as in claim 2, wherein said component (B) is uniformly dispersed in said component (A) in a substantial size of 3 μm or less.

12. A composition as in claim 1, wherein said component (B) is uniformly dispersed in said component (A) in a substantial size of 3 μm or less.

13. A composition as in claim 1, wherein said at least one wholly aromatic polyamide is selected from the group consisting of:
(i) polyamides comprised of the diamine group represented by the formula (I) and the dicarboxylic acid group represented by the formula (II) wherein Ar$_1$ is p-phenylene, 4,4'-methylenediphenylene or 4,4'-oxydiphenylene and Ar$_2$ is p-phenylene, or Ar$_1$ is p-phenylene or 1,5-naphthylene and Ar$_2$ is m-phenylene; and
(ii) polyamides comprised of the aminocarboxylic acid group represented by the formula (III) wherein Ar$_3$ is p-phenylene.

14. A composition as in claim 13, wherein said half width is 10° C. or less.

15. A composition as in claim 13, which further contains from 2 to 200 parts by weight of (C) reinforcing fiber per 100 parts by weight of component (A).

16. A composition as in claim 15, wherein said reinforcing fiber (C) is glass fiber.

17. A composition as in claim 15, wherein the amount of reinforcing fiber is from 4 to 100 parts by weight per 100 parts by weight of component (A).

18. A composition as in claim 13, which contains 0.1 to 3 parts by weight of said aromatic polyamide component (B) per 100 parts by weight of component (A).

19. A composition as in claim 13, wherein said component (B) is uniformly dispersed in said component (A) in a substantial size of 3 μm or less.

20. A composition as in claim 14, wherein said component (B) is uniformly dispersed in said component (A) in a substantial size of 3 μm or less.

21. A composition as in claim 13, wherein said component (B) is uniformly dispersed in said component (A) in a substantial size of 3 μm or less.

22. A process as in claim 5, wherein said at least one wholly aromatic polyamide is selected from the group consisting of:

(i) polyamides comprised of the diamine group represented by the formula (I) and the dicarboxylic acid group represented by the formula (III) wherein $Ar_1$ is p-phenylene, 4,4'-methylenediphenylene or 4,4'-oxydiphenylene and $Ar_2$ is p-phenylene, or $Ar_1$ is p-phenylene or 1,5-naphthylene and $Ar_2$ is m-phenylene; and (ii) polyamides comprised of the aminocarboxylic acid group represented by the formula (III) wherein $Ar_3$ is p-phenylene.

23. A process as in claim 6, wherein said at least one wholly aromatic polyamide is selected from the group consisting of:

(i) polyamides comprised of the diamine group represented by the formula (I) and the dicarboxylic acid group represented by the formula (II) wherein $Ar_1$ is p-phenylene, 4,4'-methylenediphenylene or 4,4'-oxydiphenylene and $Ar_2$ is p-phenylene, or $Ar_1$ is p-phenylene or 1,5-naphthylene and $Ar_2$ is m-phenylene; and (ii) polyamides comprised of the aminocarboxylic acid group represented by the formula (III) wherein $Ar_3$ is p-phenylene.

24. A process as in claim 23, wherein molding is conducted at a metal mold temperature of 120° C. or less.

* * * * *